United States Patent
Davis

(10) Patent No.: US 6,428,239 B1
(45) Date of Patent: Aug. 6, 2002

(54) VADOSE ZONE FOR A LEACHING FIELD

(76) Inventor: Harold E Davis, 37 Champney St., Groton, MA (US) 01450

( * ) Notice: Subject to any disclaimer, the term of this patent is extended or adjusted under 35 U.S.C. 154(b) by 0 days.

(21) Appl. No.: 09/713,404

(22) Filed: Nov. 16, 2000

(51) Int. Cl.$^7$ .......................... E02B 11/00; B01D 17/00
(52) U.S. Cl. .................. 405/43; 405/36; 405/129.2; 405/129.57; 210/170; 210/532.2
(58) Field of Search ...................... 405/36, 43, 46, 405/45, 38, 39, 50, 129.1, 129.2, 129.35, 129.57, 129.7, 129.75, 129.85; 210/170, 747, 764, 532.2; 588/252, 259

(56) References Cited

U.S. PATENT DOCUMENTS

| | | | | |
|---|---|---|---|---|
| 2,795,542 A | * | 6/1957 | Horne et al. | 210/747 X |
| 3,919,848 A | * | 11/1975 | Sullivan | 405/43 |
| 4,162,976 A | * | 7/1979 | Monson | 210/170 |
| 4,192,628 A | * | 3/1980 | Groman | 405/45 |
| 4,293,421 A | * | 10/1981 | Green | 210/170 X |
| 4,303,350 A | * | 12/1981 | Dix | 405/36 |
| 4,309,855 A | * | 1/1982 | Pate et al. | 405/45 X |
| 4,313,692 A | * | 2/1982 | Johnson | 405/43 |
| 4,526,615 A | * | 7/1985 | Johnson | 405/129.7 |
| 4,650,367 A | * | 3/1987 | Dietzler | 405/43 |
| 4,971,690 A | * | 11/1990 | Justice | 210/170 |
| 4,995,969 A | * | 2/1991 | LaVigne | 210/170 X |
| 5,017,040 A | * | 5/1991 | Mott | 405/43 X |
| 5,100,258 A | * | 3/1992 | Van Wagoner | 405/45 |
| 5,163,780 A | * | 11/1992 | Fincham | 405/36 |
| 5,362,182 A | * | 11/1994 | Hergenrother | 405/129.5 |
| 5,382,363 A | * | 1/1995 | Boylen | 210/747 X |
| 5,547,589 A | * | 8/1996 | Carroll, II | 210/747 |
| 5,597,264 A | * | 1/1997 | Laak | 405/36 |
| 5,857,807 A | * | 1/1999 | Longo, Sr. | 405/129.7 |
| 5,954,451 A | * | 9/1999 | Presby | 405/49 |

FOREIGN PATENT DOCUMENTS

FR   2608366   *   6/1988   ................. 405/36

* cited by examiner

Primary Examiner—Heather Shackelford
Assistant Examiner—Jong-Suk Lee
(74) Attorney, Agent, or Firm—Abraham Ogman

(57) ABSTRACT

A vadose zone for a leaching field which enables the construction of a leaching field in terrain where conventional leaching fields cannot be constructed. Such terrain also comprise areas where a high water table exists or where percolation tests fail. The vadose zone is constructed adjacent to the leaching field which is buried in a layer of soil which has been constructed over a nonporous barrier such as a plastic sheet or ledge or clay. The effluent from the leaching field is forced to move sideways out of the leaching field into the adjacent soil. The adjacent soil becomes a vadose zone to complete treating the effluent. The effluent is forced to flow through a prescribed predetermined distance through the vadose zone before it is permitted to disperse through the soil toward the water table or over the clay or ledge.

5 Claims, 1 Drawing Sheet

VADOSE ZONE FOR A LEACHING FIELD

BACKGROUND OF THE INVENTION

1. Field of the Invention

In most jurisdictions, sewage treatment authorities require that the septic effluent flowing from a leaching field flow a predetermined minimum distance through a porous medium, such as natural soil, to assure that the septic effluent is thoroughly treated and is completely dispersed. In most cases the minimum distance is four feet. Some jurisdictions require only 2 feet others as much as 6 feet. The purpose of the separation is to assure that the effluent flowing down from the leaching field is fully treated.

The invention is particularly suited to terrain where the water table is at or higher than the prescribed minimum dispersion distance discussed above. The invention also enables the use of leaching fields in soils, such as clay or above the ground where the ground cannot pass percolation tests, such as ledge or a particular thick layer of clay.

2. Definitions

For purposes of this discussion the term "vadose zone" shall apply to the aerobic region outside of the conventional leaching field through which the septic effluent from the leaching field flows and receives additional treatment and is dispersed to the surrounding soil and eventually into the water table.

Typically a leaching field is constructed in sand. Soil or dirt is hereby defined to mean the compacted natural material surrounding the leaching field. The soil or dirt is less porous than sand.

3. Related Prior Art

U.S. Pat. No. 4,192,628 to German issued Mar. 11, 1980 is directed to a distributor unit for use in leaching fields. It comprises a hollow open-bottomed concrete structure with a central cavity filled with sand. Effluent from a septic tank to the sand bed and generally out the bottom. The side walls have openings to allow evaporation of liquid from the central cavity.

U.S. Pat. No. 5,547,589 to Carol II issued Aug. 20, 1996 is directed to a Water recovery from a septic tank. A modular vertical filter extends into the ground. Water accumulates at the bottom of the filter and is pumped into the surrounding soil.

U. S. Pat. No. 5,934,451 to Presby issued Sep. 21,1999 is directed to using multilayer of fabric to process septic effluent. Each layer being of a selected denier. The fabric is used in combination with conduit in a drainage field or leaching field.

4. Objects of the Invention

The principal object of the invention is to provide a means for using conventional leaching fields in soil with unsuitable drainage or in terrain where the separation between a proposed leaching field and its water table does not meet specifications i.e., the water table is too high for normal use with a conventional leaching field.

It is also an object of the invention to construct a vadose zone that will direct the septic effluent from a leaching field to disperse though soil for a predetermined distance prescribed by regulations.

It is another object of the invention to construct a vadose zone situated to the side of, the leaching field.

It is another object of the invention to construct a vadose zone in which septic effluent is forced to flow laterally by an impervious barrier constructed under an otherwise conventional leaching field.

SUMMARY OF THE INVENTION

In accordance with the invention there is constructed a conventional leaching field such as a number of perforated pipes embedded within sand or other porous media. A impervious barrier is placed under the leaching field to prevent the effluent from percolating vertically down into the soil. The impervious barrier extends laterally in all directions for a prescribed distance to force the effluent from the leaching field to flow sideways from the sand into soil or dirt. The barrier creates a vadose zone to the side of the leaching field starting where the sand ends and the soil begins. At the edge of the barrier the effluent is permitted to flow naturally downward through the soil or over the ground in the case of ledge.

DESCRIPTION OF THE PREFERRED EMBODIMENT

Figure 1:
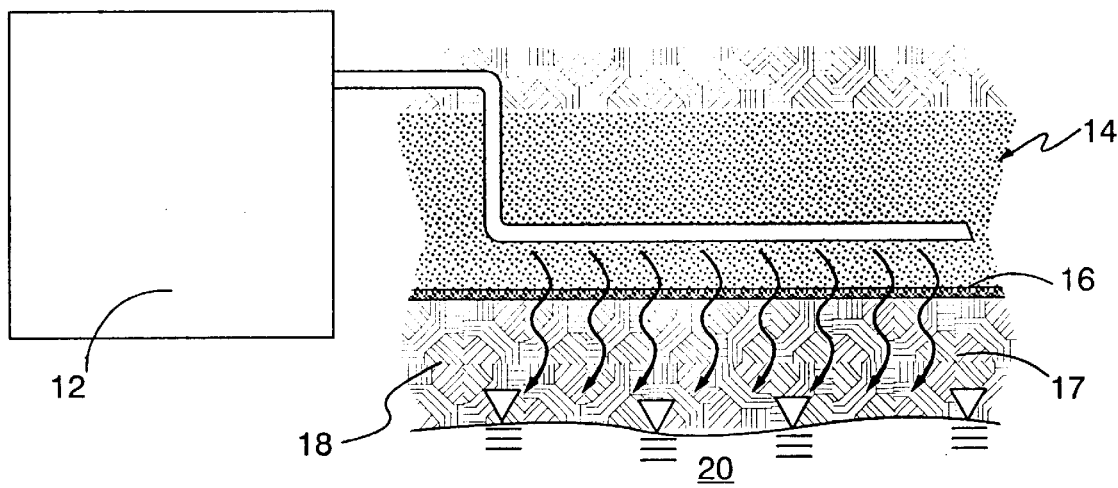
FIG. 1 is a side view of a standard septic tank leaching field arrangement

Referring to FIG. 1 there is shown a standard or conventional septic sewage treatment system containing a septic tank 12 and a leaching field 14. Solids contained in the sewage effluent settles in the septic tank and are broken down into dissolved solids. Partially treated effluent leaves the septic tank 12 and flows to the leaching field 14, where it is aerobically treated. The result of the treatment is a biomat 16 comprising a layer of bacteria and an essentially treated septic effluent 17. The essentially treated septic effluent 17 flows vertically through the biomat into a vadose zone 18 situated between the leaching field 14 and a water table 20. The vadose zone 18 disperses the effluent and completes the treatment of the septic effluent. The depth of the vadose zone 18 is controlled to assure that the effluent is fully treated before it enters the water table 20. If the effluent is suitably pretreated with an aerobic treatment system, no biomat will form. The vadose zone will complete the treatment.

Figure 2:
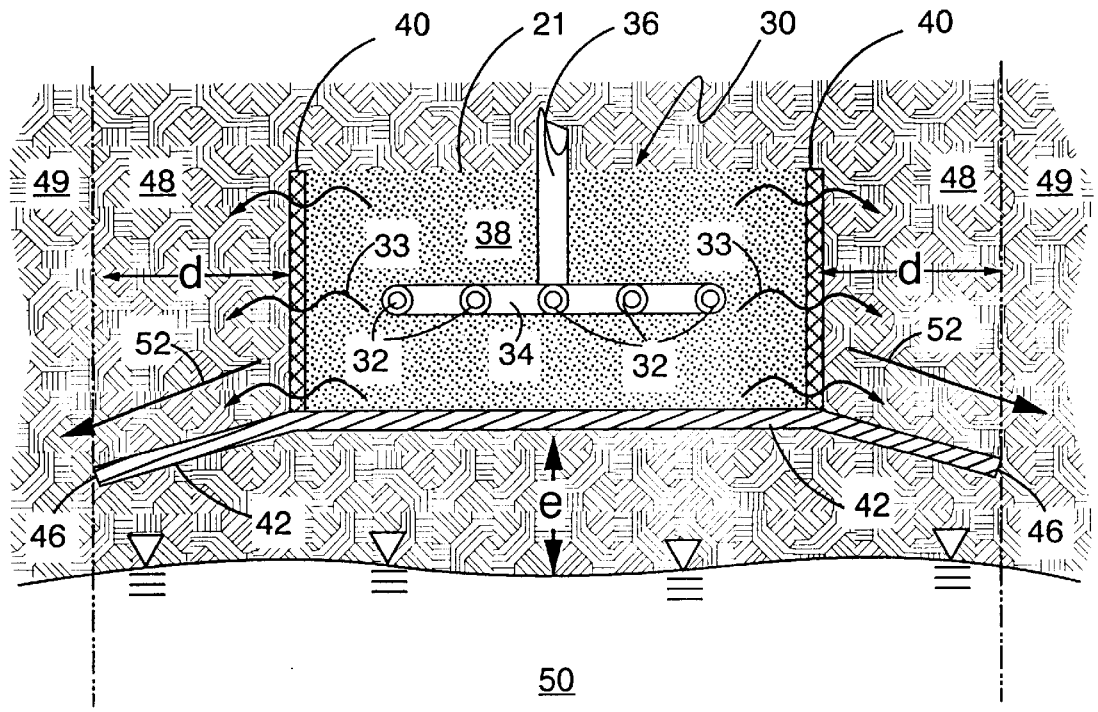
FIG. 2 is a side representation of a vadose zone for a leaching field in accordance with this invention.

Referring to FIG. 2 and the invention, there is shown schematically a leaching field 30. Its construction is conventional and contains a plurality of perforated pipes 32 joined at on end by plenum 34. A supply pipe 36 is designed to bring septic fluid from a septic tank (not shown) to the leaching field 30. The pipes 32 lie embedded in a bed of sand 38 or other suitable porous media, for dispersing the septic effluent leaving the pipes.

In FIG. 2 there is shown a non-porous surface or barrier 42 for preventing the effluent from flowing vertically downward. The barrier 42 may be a plastic sheet or in areas of ledge or clay, the barrier may be the surface of the ledge or clay. A layer of soil 49 is constructed over the barrier 42 to a depth sufficient to contain the leaching field 30. A cavity 21 is constructed in the soil 49. The conventional leaching field 30 is placed in the cavity and positioned on the barrier 42.

Surrounding the leaching field is a porous wall 40, such as a fine screen, which is designed to block sand or porous media 38 from gravitating into the adjacent soil 49. The septic effluent 33, however, can pass through the screen 40.

The region adjacent to the screen 40 and above the barrier 42 makes up a vadose zone 48. The edges 46 of the barrier 42 define the edges of the of the vadose zone 48.

The entire assembly comprising the leaching field 30, screen 42, and vadose zone 48 is formed with soil or other suitable media 49 to treat and disperse the effluent flowing therein.

The water table is shown symbolically at 50. The ground soil is symbolically identified at 49.

The septic effluent from a septic tank flows into pipe 36 and then into the plenum 34 from which it is distributed to the perforated pipes 32. The septic effluent fluid flows from the pipes 32 into the sand 38 and is aerobically treated. It then moves through the screen 40 into the vadose zone 48. receives additional treatment if needed and is dispersed though the soil making up the vadose zone 48. Because the barrier 42 lies below the conventional leaching field 30, the septic fluid is forced to flow sideways or laterally through the screen 40 into the vadose dispersion field 48. See arrows 52. The septic effluent continues to flow sideways with a downward bias until it reaches the edge 46 of the barrier 42. The septic effluent then flows into the surrounding native soil 48 and into the water table 50.

Before the septic effluent can flow to the water table 50 it must traverse a distance "d" through the dispersion field or vadose zone 48. The distance "d" exceeds the vertical distance "e" between the leaching field and the water table. The distance "d" equals or exceeds the minimum dispersion distance mandated by regulations.

While the invention has been particularly shown and described with reference to the preferred embodiment, it will be understood by those skilled in the art that various changes in form and details may be made therein without departing from the spirit and scope of the invention as defined by the appended claims.

What is claimed is:

1. A vadose zone for a leaching field comprising:

a nonporous barrier:

a leaching field, for treating septic effluent, including a source of the septic effluent embedded in a porous media and being situated on the nonporous barrier and the septic effluent flows laterally out of the leaching field and over the nonporous barrier; and a layer of soil encircling the leaching field is deposited on the nonporous barrier, the encircling soil forms the vadose zone receiving and further treating the septic effluent flowing out of the leaching field.

2. A vadose zone for a leaching field comprising:

a nonporous barrier extending sideways in all directions for a predetermined distance;

a leaching field, including a source of septic effluent embedded in a porous media, is positioned on the nonporous barrier and the septic effluent leaving the leaching field to flow laterally out of the leaching field and over the nonporous barrier; and a layer of soil encircling the leaching field is deposited on the nonporous barrier within the predetermined distance, the encircling soil forms the vadose zone for receiving and treating the septic effluent flowing out of the leaching field.

3. The vadose zone as defined in claim 2 which includes in addition a screen positioned between the layer of soil and the porous media to prevent mixing the layer of soil and the porous media.

4. A vadose zone for a leaching field comprising:

a nonporous barrier, the extent of which is defined by its edges;

a leaching field, having a source of septic fluid disposed within a porous media, is positioned on the nonporous barrier a predetermined distance from said edges and the septic effluent flows laterally over the nonporous barrier through the porous media to exit the leaching field; and a layer of soil covers the nonporous barrier and encircles the leaching field for at least said predetermined lateral distance, the encircling soil forming the vadose zone for receiving and treating the septic effluent exiting the leaching field.

5. The vadose zone as defined in claim 4 where the porous media is sand and which includes, in addition, a porous fluid screen positioned on the nonporous barrier between the encircling layer of soil and the leaching field to prevent mixing the sand and the layer of soil.

* * * * *